(12) United States Patent
Glauert et al.

(10) Patent No.: US 10,908,916 B2
(45) Date of Patent: Feb. 2, 2021

(54) APPARATUS AND METHOD FOR EXECUTING A PLURALITY OF THREADS

(71) Applicant: ARM LIMITED, Cambridge (GB)

(72) Inventors: Timothy Holroyd Glauert, Little Shelford (GB); David Hennah Mansell, Norwich (GB); Rune Holm, Cambridge (GB)

(73) Assignee: ARM Limited, Cambridge (GB)

( * ) Notice: Subject to any disclaimer, the term of this patent is extended or adjusted under 35 U.S.C. 154(b) by 262 days.

(21) Appl. No.: 15/058,389

(22) Filed: Mar. 2, 2016

(65) Prior Publication Data

US 2016/0259668 A1 Sep. 8, 2016

(30) Foreign Application Priority Data

Mar. 4, 2015 (GB) .................................. 1503648.6

(51) Int. Cl.
*G06F 9/38* (2018.01)
*G06T 1/20* (2006.01)

(52) U.S. Cl.
CPC .............. *G06F 9/3851* (2013.01); *G06T 1/20* (2013.01)

(58) Field of Classification Search
CPC ................................ G06F 9/3851; G06T 1/20
See application file for complete search history.

(56) References Cited

U.S. PATENT DOCUMENTS

| | | | | |
|---|---|---|---|---|
| 5,241,626 A | * | 8/1993 | Taoda ..................... | G06T 3/606 345/569 |
| 5,778,416 A | * | 7/1998 | Harrison .................. | G06T 1/60 711/217 |
| 5,956,757 A | * | 9/1999 | Sun ......................... | G06F 9/355 360/49 |
| 6,314,507 B1 | * | 11/2001 | Doyle ..................... | G06F 9/355 708/708 |
| 6,930,688 B1 | * | 8/2005 | Pether ..................... | G06T 1/60 345/441 |
| 2005/0010742 A1 | * | 1/2005 | Vavro ..................... | G06F 9/355 711/218 |

(Continued)

OTHER PUBLICATIONS

CPU-Assisted GPGPU on Fused CPU-GPU Architectures Yi Yang, Ping Xiang, Mike Mantor*, Huiyang Zhou 2012.*
CUDA Thread Basics Samuel S. Cho 2011.*
Computer Architecture A Quantitative Approach John L. Hennessy and David A. Patterson Fifth Edition, Section 4.4 (Year: 2012).*
Nvidia—Tesla GPU Computing John Nickolls Hot Chips 2007: NVIDIA GPU Parallel Computing Architecture (Year: 2007).*
Arrays Robert Lowe CpSc 2310 course notes (Year: 2018).*

(Continued)

*Primary Examiner* — Emerson C Puente
*Assistant Examiner* — Paul V Mills
(74) *Attorney, Agent, or Firm* — Nixon & Vanderhye P.C.

(57) ABSTRACT

An apparatus and method are provided for executing a plurality of threads. The apparatus has processing circuitry arranged to execute the plurality of threads, with each thread executing a program to perform processing operations on thread data. Each thread has a thread identifier, and the thread data includes a value which is dependent on the thread identifier. Value generator circuitry is provided to perform a computation using the thread identifier of a chosen thread in order to generate the above mentioned value for that chosen thread, and to make that value available to the processing circuitry for use by the processing circuitry when executing the chosen thread. Such an arrangement can give rise to significant performance benefits when executing the plurality of threads on the apparatus.

15 Claims, 11 Drawing Sheets

(56) References Cited

U.S. PATENT DOCUMENTS

| | | | |
|---|---|---|---|
| 2005/0206649 A1* | 9/2005 | Whitaker | G06F 9/345 345/571 |
| 2007/0022428 A1 | 1/2007 | Yamasaki | |
| 2007/0083729 A1* | 4/2007 | Moat | G06F 9/345 711/217 |
| 2007/0165042 A1 | 7/2007 | Yagi | |
| 2009/0292898 A1* | 11/2009 | Persson | G06F 9/345 711/200 |
| 2010/0123728 A1* | 5/2010 | Kawahara | G09G 5/397 345/536 |
| 2010/0145993 A1* | 6/2010 | Rakib | G06F 9/345 707/781 |
| 2010/0250897 A1* | 9/2010 | Gaillat | G06F 9/345 712/22 |
| 2011/0307684 A1* | 12/2011 | Kreinin | G06F 9/30043 712/3 |
| 2012/0017062 A1* | 1/2012 | Goel | G06F 9/3851 711/170 |
| 2012/0089792 A1* | 4/2012 | Fahs | G06F 9/30036 711/154 |
| 2012/0223947 A1* | 9/2012 | Nystad | G06T 15/005 345/426 |
| 2012/0311305 A1* | 12/2012 | Kobayashi | G06F 9/3891 712/221 |
| 2014/0310484 A1 | 10/2014 | Giroux | |
| 2015/0160982 A1 | 6/2015 | Glauert | |

OTHER PUBLICATIONS

Programming Massively Parallel Processors A Hands-on Approach David B.KirkandWen-meiW.Hwu Chapters 3, 4, and 14 (Year: 2013).*

Programming in C Bharat Kinariwala p. 306-307 (Year: 1998).*

The Ins and Outs of C Arrays Nick Parlante and Julie Zelenski (Year: 2008).*

FPGA Implementation of Heterogeneous Multicore Platform with SIMD/MIMD Custom Accelerators Hasitha Muthumala Waidyasooriya, Yasuhiro Takei, Masanori Hariyama and Michitaka Kameyama (Year: 2012).*

Energy Efficient Coarse-Grain Reconfigurable Array for Accelerating Digital Signal Processing Marco Lanuzza, Stefania Perri, Pasquale Corsonello, and Martin Margala (Year: 2009).*

A Partitioning Programming Environment for a Novel Parallel Architecture R. Hartenstein, J. Becker, M. Herz, R. Kress, U. Nageldinger (Year: 1996).*

D2MA: Accelerating Coarse-Grained Data Transfer for GPUs D. Anoushe Jamshidi, Mehrzad Samadi, and Scott Mahlke (Year: 2014).*

Search Report for GB1503648.6 dated Sep. 7, 2015, four pages.

U.S. Appl. No. 14/557,935, filed Dec. 2, 2014, Glauert.

Office Action for GB Application No. 1503648.6 dated Oct. 6, 2020, 5 pages.

* cited by examiner

DATA IMAGE REGION TO BE PROCESSED (260)

250

| 0x1000 | 0x1004 | 0x1008 | 0x100C | 0x1010 | 0x1014 | 0x1018 |
| 0x1020 | 0x1024 | 0x1028 | 0x102C | 0x1030 | 0x1034 | 0x1038 |
| 0x1040 | 0x1044 | 0x1048 | 0x104C | 0x1050 | 0x1054 | 0x1058 |
| 0x1060 | 0x1064 | 0x1068 | 0x106C | 0x1070 | 0x1074 | 0x1078 |
| 0x1080 | 0x1084 | 0x1088 | 0x108C | 0x1090 | 0x1094 | 0x1098 |
| 0x10a0 | 0x10a4 | 0x10a8 | 0x10aC | 0x10b0 | 0x10b4 | 0x10b8 |

WHEN USING FIG 3 APPROACH:
THREAD COORDINATES HAVE 1 ADDED TO x & y DIMENSIONS TO RUN FROM (1,1) TO (5,4)
g[0] = 0x1000, g[1] = 0x4, g[2] = 0x20, g[3] = 0

WHEN USING FIG 4 APPROACH:
g[0] = 0x1024, g[1] = 1, g[2] = 0x5, g[3] = 0x4, g[4] = 0x5, g[5] = 0x4, g[6] = 0x20

FIG. 5

THREAD P
⋮
MRS   x0, spec reg 0        spec reg 0 CONTAINS
LDR   x1, [x0]              ADDRESS CALCULATED
                            FOR THREAD P BY
                            VALUE GENERAOR
⋮

FIG. 9A

THREAD P
⋮
LDR   x0, [special reg 0]

FIG. 9B

APPARATUS AND METHOD FOR EXECUTING A PLURALITY OF THREADS

This application claims priority to GB Patent Application No. 1503648.6 filed 4 Mar. 2015, the entire content of which is hereby incorporated by reference.

BACKGROUND

The present technique relates to an apparatus and method for executing a plurality of threads.

It is known for a contemporary data processing apparatus such as a graphics processing unit (GPU) to be programmed in a single program multiple data (SPMD) fashion in which the programmer provides a single program (known as a kernel) and a set of multiple data items on which that single program should operate. OpenCL for example provides a way for a programmer to arrange for the GPU to execute SPMD kernels. The data processing apparatus then creates and executes a thread for each data item within that data set. For example, in the context of image processing on a GPU (which is designed to execute a large number of threads efficiently), a thread can be created and executed for each pixel in a frame, with the multiple different threads being executed in order to perform the same data processing operations on each pixel within the frame. When defining such a task for a GPU, it is known to provide an N dimensional range of thread identifiers used to determine the multiple threads that are required to execute the program. In OpenCL, such an N dimensional range is referred to as "NDRange", where N may vary from 1 to 3. A separate thread is created for each thread identifier within the range, and each created thread then executes the kernel.

In order for the threads to do distinct useful work, the data processed by each thread will typically depend on the thread identifier. The above arrangement is often used to execute kernels which perform work over a matrix, image or array of data. Which data value within the matrix, image or array is to be processed by each thread will typically depend on the thread identifier, and accordingly it is necessary for the kernel to compute the relevant location within the matrix, image or array identifying the data value applicable to that thread from the thread identifier. The kernel typically includes a series of arithmetic instructions for that purpose. Whilst the data processing apparatus can be designed to execute those instructions efficiently, that series of instructions must be executed separately within each thread, which gives rise to a significant amount of computation which can adversely affect performance. This performance impact can be particularly significant if the operations performed by the rest of the kernel are relatively simple.

Accordingly, it would be desirable to provide an improved mechanism for providing such thread identifier dependent values.

SUMMARY

In one example arrangement, there is provided an apparatus, comprising: processing circuitry to execute a plurality of threads, each thread executing a program to perform processing operations on thread data, each thread having a thread identifier, and the thread data including a value which is dependent on the thread identifier; and value generator circuitry to perform a computation using the thread identifier of a chosen thread in order to generate said value for the chosen thread, and to make said value available to the processing circuitry for use by the processing circuitry when executing said chosen thread.

In another example arrangement, there is provided a method of executing a plurality of threads, comprising: employing processing circuitry to execute said plurality of threads, each thread executing a program to perform processing operations on thread data, each thread having a thread identifier, and the thread data including a value which is dependent on the thread identifier; and employing value generator circuitry to perform a computation using the thread identifier of a chosen thread in order to generate said value for the chosen thread, and to make said value available to the processing circuitry for use by the processing circuitry when executing said program for the chosen thread.

In a yet further example arrangement, there is provided an apparatus, comprising: processing means for executing a plurality of threads, each thread for executing a program to perform processing operations on thread data, each thread having a thread identifier, and the thread data including a value which is dependent on the thread identifier; and value generator means for performing a computation using the thread identifier of a chosen thread in order to generate said value for the chosen thread, and for making said value available to the processing means for use by the processing means when executing said program for the chosen thread.

BRIEF DESCRIPTION OF THE DRAWINGS

The present technique will be described further, by way of example only, with reference to embodiments thereof as illustrated in the accompanying drawings, in which:

FIG. 5 schematically illustrates how the value generation computations of FIGS. 3 and 4 may be performed when a particular region of an image is being processed, in accordance with one embodiment;

FIGS. 9A and 9B illustrate instructions that can be added to each thread to access the value(s) generated by the value generator circuitry in accordance with one embodiment.

DESCRIPTION OF EMBODIMENTS

Figure 1:
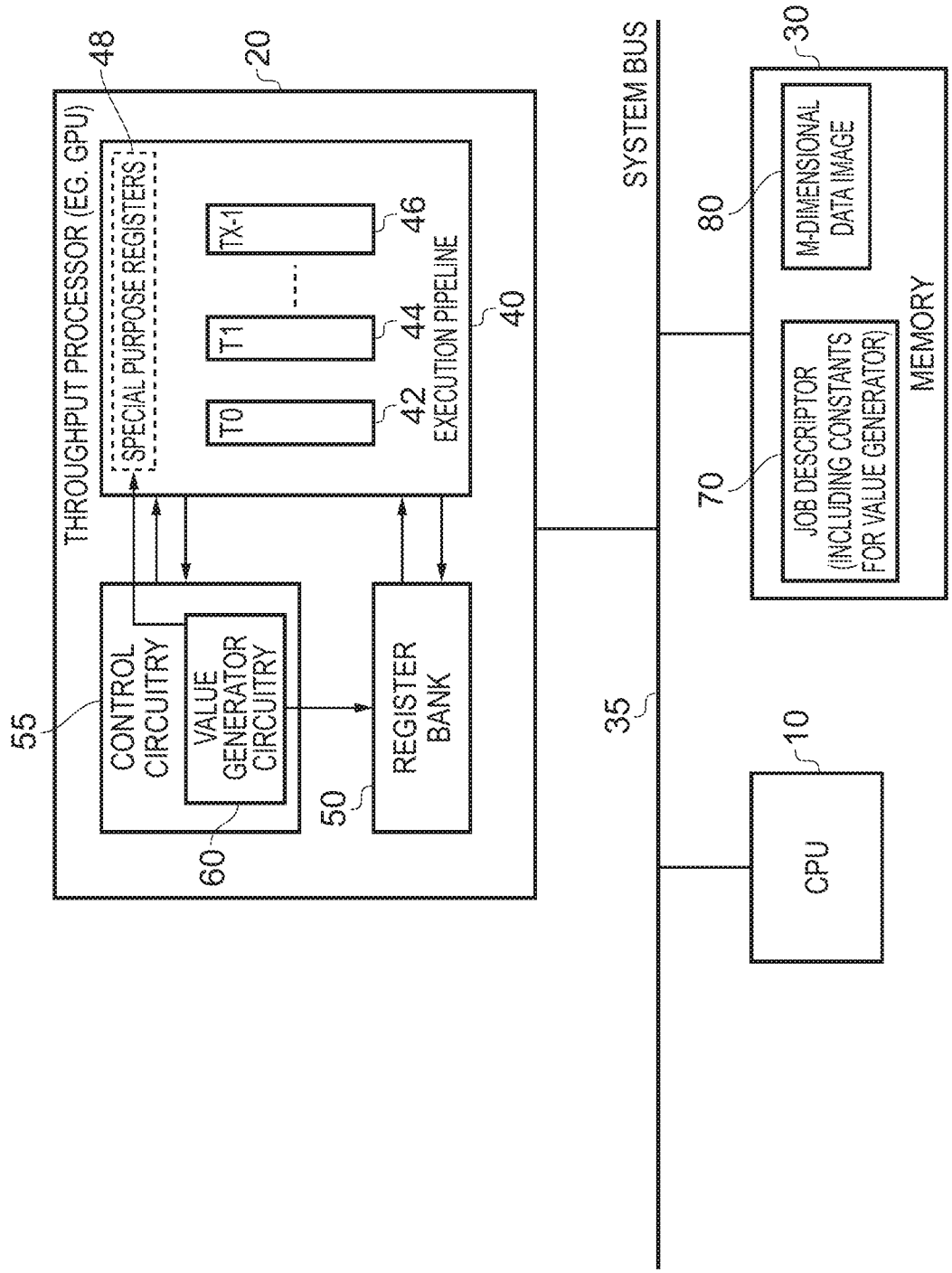
FIG. 1 is a block diagram of a system including a data processing apparatus in accordance with one embodiment.

Before discussing the embodiments with reference to the accompanying figures, the following description of embodiments is provided.

In accordance with one example arrangement, an apparatus is provided that has processing circuitry to executed a plurality of threads, where each thread executes a program to perform processing operations on thread data. Each thread has a thread identifier, and the thread data includes a value which is dependent on the thread identifier. Value generator circuitry is then used to perform a computation using a thread identifier of a chosen thread in order to generate the above mentioned value for the chosen thread, and to then make that value available to the processing circuitry for use by the processing circuitry when executing the chosen thread.

In accordance with the above arrangement, rather than executing a series of instructions within each thread in order to compute the value applicable for the associated thread, value generator circuitry external to the thread is instead used to perform a computation based on the thread identifier in order to generate the required value for any particular thread. This value can then be made available to the processing circuitry when it executes that thread, for example by storing that value in a register accessible to the processing circuitry.

This can significantly reduce the computation required within each thread, and hence give rise to significant performance benefits. Further, by providing separate value generator circuitry, it is possible for that circuitry to generate the values required for multiple threads, in one embodiment for all of the various threads, and this can give rise to significant efficiency gains when compared with the prior art approach, where each thread was required to calculate in isolation the value applicable to that thread.

There are a number of ways in which the plurality of threads, and the program to be executed by those threads, can be identified. In one embodiment, the processing circuitry is arranged to process a task, the task specifying an N dimensional range of thread identifiers used to determine the plurality of threads, and a same program to be executed as said program by each of the plurality of threads. In one embodiment, the task can be defined by another element in the system, such as a central processing unit (CPU) coupled to the above described apparatus, for example by storing the details of the task in a portion of memory shared between the CPU and the above mentioned apparatus. The above mentioned apparatus can then in one embodiment take the form of a throughput processor, for example a GPU, which loads the details of the task in from the memory and then creates and executes the required threads in accordance with the thread identifier information and the program information specified by the task. In an alternative embodiment, the processing circuitry may itself define tasks for it to perform, for example where one task is used to set up other tasks.

In one embodiment, the apparatus can concurrently be naming multiple such tasks, one example being where a new task is set up as an old task comes to an end.

The value generator circuitry can be configured in a variety of ways. In one embodiment, the value generator circuitry is arranged to perform the computation using as inputs the thread identifier of the chosen thread and a set of constant values that are fixed for said task. In one particular embodiment, the task further specifies the set of constant values, and hence the element in the system responsible for defining the task can set the constant values appropriately in order to allow useful values to be computed by the value generator circuitry for subsequent reference by the processing circuitry when executing the various threads defined for the task. Such an approach can be readily incorporated into existing GPU drivers.

In one embodiment, APIs such as OpenCL specify compilation of kernels at runtime. So in such an embodiment the OpenCL implementation can, at compile time, inspect the code and identify useful values which can be computed using the circuitry, and output a compiled kernel that uses the generated values and the constants needed to generate them at the same time. In addition, as these details are only visible inside the OpenCL implementation, a program written to use OpenCL could take advantage of the above described techniques without needing any changes.

There are a number of ways in which the value generator circuitry can be arranged to perform the computation required to produce the value that is dependent on the thread identifier. In one embodiment, the value generator circuitry is arranged to perform the computation by determining the sum of a plurality of terms, each term being determined by performing a sub-computation on term-specific inputs, said term-specific inputs comprising at least one constant specified for that teen and at least a part of the thread identifier. Where the range of thread identifiers is one dimensional, then each sub-computation may use the thread identifier. However, if the range of thread identifiers is multi-dimensional, such that the thread identifier for each thread may then for example comprise multiple coordinate values, each sub-computation may in one embodiment use one of the coordinate values of the thread identifier. This enables a simplification of the computation. For example, it is common for data structures/matrices, etc. to have an address component depending on each coordinate value, so arranging the generators in this way is an efficient approach.

In one embodiment, the value generator circuitry is further arranged to generate the value by adding the sum of the plurality of terms to a predetermined constant value in the above mentioned set of constant values. In one embodiment, this for example enables the base address of the data structure to be added.

In one embodiment, the number of terms in said plurality of terms is fixed to provide one term for each dimension of a maximum number of dimensions supported by the value generator circuitry. In particular, the apparatus of which the value generator circuitry is part will typically be designed having regards to a maximum number of dimensions that can be supported. For example referring to the earlier mentioned example of OpenCL, the maximum number of dimensions supported would be three dimensions. If, for any particular task, less than the maximum number of dimensions are actually utilised, then in one embodiment the constant value input in relation to the sub-computation to be performed for that unused dimension can be set to a value that effectively removes that sub-computation. For example, in an arrangement where the sub-computation involves a multiplication of a constant by another input, that constant could be set to zero for the relevant sub-computation. Alternatively the term could be ignored (so the term from unused dimensions is not added on), or in one embodiment the fact that unused dimensions have a value zero themselves so nothing happens is exploited (e.g. if a 5×5 2D job is specified, this is equivalent to a 5×5×1 3D job, and for such a job the coordinate range could be set to be (0,0,0)-(4,4,0), i.e. the z coordinate would always be zero).

Whilst in the above mentioned embodiment the plurality of terms is fixed, in an alternative embodiment the number of terms in the plurality of terms may be configurable. By varying the number of terms, this enables significantly improved flexibility as to how the value for any particular thread is generated from the thread identifier.

In one embodiment, the processing circuitry executes said plurality of threads in order to process an M-dimensional array of data values, each thread executing the program in relation to one of the data values in said M-dimensional array. The value generator circuitry may then be arranged to perform the computation for the chosen thread in order to identify as said value a location of the data value for the chosen thread within said M-dimensional array. Hence, in such embodiments, the computation performed by the value generator circuitry effectively maps the thread identifier to a particular location within the M-dimensional array, and hence identifies a particular data value within that M-dimensional array.

In one particular embodiment, the M-dimensional array of data values is stored in memory and said value generated by the value generator circuitry comprises a memory address associated with the data value for the chosen thread.

In one embodiment the N-dimensional range of thread identifiers is a one dimensional range, and hence for example in one particular embodiment the various thread identifiers may increase from zero to a value one less than the total number of threads.

In one such embodiment, the number of terms and the constant values are specified so that performance of the computation by the value generator circuitry causes each of a plurality of sub-ranges of thread identifiers within the one dimensional range to map to a different M-dimensional block within the M-dimensional array. This can give rise to significant performance improvements, by taking account of certain hardware constraints within the system. For example, advantages related to cache locality can result if the data values within the M-dimensional array are processed in a particular order, hence increasing efficient utilisation of the cache. Thus, by specifying the number of terms and the constant values in an appropriate manner, the various data values within the M-dimensional array can be processed in a series of blocks aimed at improving efficient hardware utilisation, such as the above mentioned cache utilisation. A technique for ordering threads into blocks is described in commonly owned co-pending U.S. patent application Ser. No. 14/557,935, the entire contents of which are hereby incorporated by reference.

In an alternative embodiment, the N-dimensional range of thread identifiers is a multi-dimensional range and each thread identifier specifies coordinate values in said N-dimensional range.

Whilst N can be different to M, in one embodiment N=M. Hence, the coordinate space over which the program is nut by the various threads reflects the shape of the M-dimensional array of data values. As one very specific example, a task may be defined to include a 1920×1080 array of thread identifiers in order to cause a plurality of threads to be created to work on a 1920×1080 image within a GPU, with each thread performing a computation related to the corresponding pixel in the image. The computation can take a variety of forms, but could for example be a filter operation, where each thread generates a new value for the corresponding pixel in the output image.

The set of constant values provided as an input to the value generator circuitry can take a variety of forms, but in one embodiment the set of constant values provides an indication of a base location (e.g. a base address in memory), a data size of the data values in the M-dimensional array, and a number of data values extending in each dimension of the M-dimensional array.

In one embodiment, the value generator circuitry is arranged to perform the computation for each of the plurality of threads in order to generate the value for each thread.

However, in an alternative embodiment, the plurality of threads may be considered to consist of a plurality of thread groups, and the value generator circuitry can in such an embodiment be arranged to compute the value for a chosen thread in each thread group, and to generate a vector of offset values for use by the processing circuitry to derive the value for each of the threads in the thread group based on the value computed for the chosen thread of the thread group. Hence, in such an arrangement, it is not necessary to separately compute each value, since within each thread group the values applicable to each thread of that thread group can be derived from the value computed for one of threads.

In one such embodiment, each of the threads within the thread group is constrained to be executed in lock-step, such that at any particular point in time each thread in the thread group is executing the same instruction within the program. In such an arrangement, the above approach of providing a value for one of the threads in the thread group, along with a vector of offset values, can provide a particularly efficient implementation.

The value generator circuitry can be arranged to generate the required values at any suitable point in time, but will typically be configured so as to make the values available to the processing circuitry by the time the processing circuitry requires that value during execution of the thread. In one embodiment, the value generator circuitry is arranged to precompute the value for the chosen thread prior to the processing circuitry executing that chosen thread.

In one particular embodiment, the value generator circuitry is arranged to store each computed value in a register for access by the processing circuitry. This register may be a special purpose register, or in an alternative embodiment can be a general purpose register.

The value generator circuitry can be constructed in a variety of ways. In one embodiment, the value generator circuitry comprises a plurality of computation elements, each computation element being arranged to perform the sub-computation of a term allocated to that computation element.

In one particular embodiment, each of the computation elements can be identically constructed, in order to perform the same sub-computation, but with each computation element being provided with a different set of inputs.

In one embodiment, each computation element is formed by stepper circuitry arranged to use a counter mechanism to control the output from that computation element. This enables relatively simple counter circuits to be used, and can avoid the need for more complex circuits such as multipliers.

In one embodiment, the value generator circuitry may comprise multiple generators, each generator arranged to perform a different computation such that said multiple generators generate, for the chosen thread, multiple values that are dependent on the thread identifier. Hence, multiple thread identifier dependent values can be generated for each thread using such multiple generators. This may be useful if a kernel needs to access multiple images or arrays, for example when reading an input image, performing some computation and writing to an output image.

Whilst in one embodiment, each generator may have its own dedicated set of computation elements, in an alternative embodiment the multiple generators may share use of a plurality of computation elements. Accordingly, by way of example, particular computation elements may be allocated for some portion of time to one generator, and for another portion of time to a different generator. This allows flexibility in how the generator resources are used, for example some kernels can use a small number of complex generators with many terms while other kernels may use a larger number of simpler generators with fewer terms.

Particular embodiments will now be described with reference to the Figures.

FIG. 1 is a block diagram of a system in accordance with one embodiment, the system including a central processing unit (CPU) 10 coupled via a system bus 35 with a throughput processor 20, which for example may be a graphics processing unit (GPU) in one embodiment. Both CPU 10 and throughput processor 20 share access to memory 30.

When the CPU 10 wishes to set up a task for the throughput processor to perform, it writes a job descriptor 70 for that task in memory 30, and then notifies the throughput processor 20 (in one embodiment this notification may occur by the GPU having a slave connection onto the bus), whereupon the throughout processor can retrieve the job descriptor from memory and begin performing the defined task.

The throughput processor 20 includes processing circuitry in the form of an execution pipeline 40 that can be configured to execute a plurality of threads using execution resources 42, 44, 46. Each thread will execute a program specified by the task, with each thread typically operating on different data. In one embodiment, the job descriptor identifies the program to be executed by the threads, and provides an N-dimensional range of thread identifiers used to determine the number of threads required to be executed in order to implement the task. Control circuitry 55 then creates the individual threads, and notifies the execution pipeline 40 in order to cause the various threads to be executed. During execution of the various threads, the execution pipeline 40 will have access to a register bank 50 containing a set of general purpose registers that can be used to store data values required when executing the threads. One or more special purpose registers 48 can also be provided within the execution pipeline 40 for access by the threads.

In one embodiment, at least one item of data used within each thread during execution of the program has a value which is dependent on the thread identifier of that thread. In accordance with one embodiment, value generator circuitry 60 is provided, for example within the control circuitry 55, to precompute such values and make them available to the execution pipeline 40 for use by the execution pipeline when executing the various threads. The values may in one embodiment be stored within special purpose registers 48, or can alternatively be stored within one or more of the general purpose registers 50.

In one example embodiment, the task specified by the job descriptor 70 may require operations to be performed in respect of an M-dimensional data image 80 stored in memory 30, where a separate thread is established to operate on each data value within that data image. One example of a value that can be generated by the value generator circuitry 60 is a memory address to identify a particular data value within the data image 80 applicable to a particular thread. In particular, based on the thread identifier, the value generator circuitry can perform a computation in order to determine the memory address for the corresponding data value in the data image 80.

Figure 2:
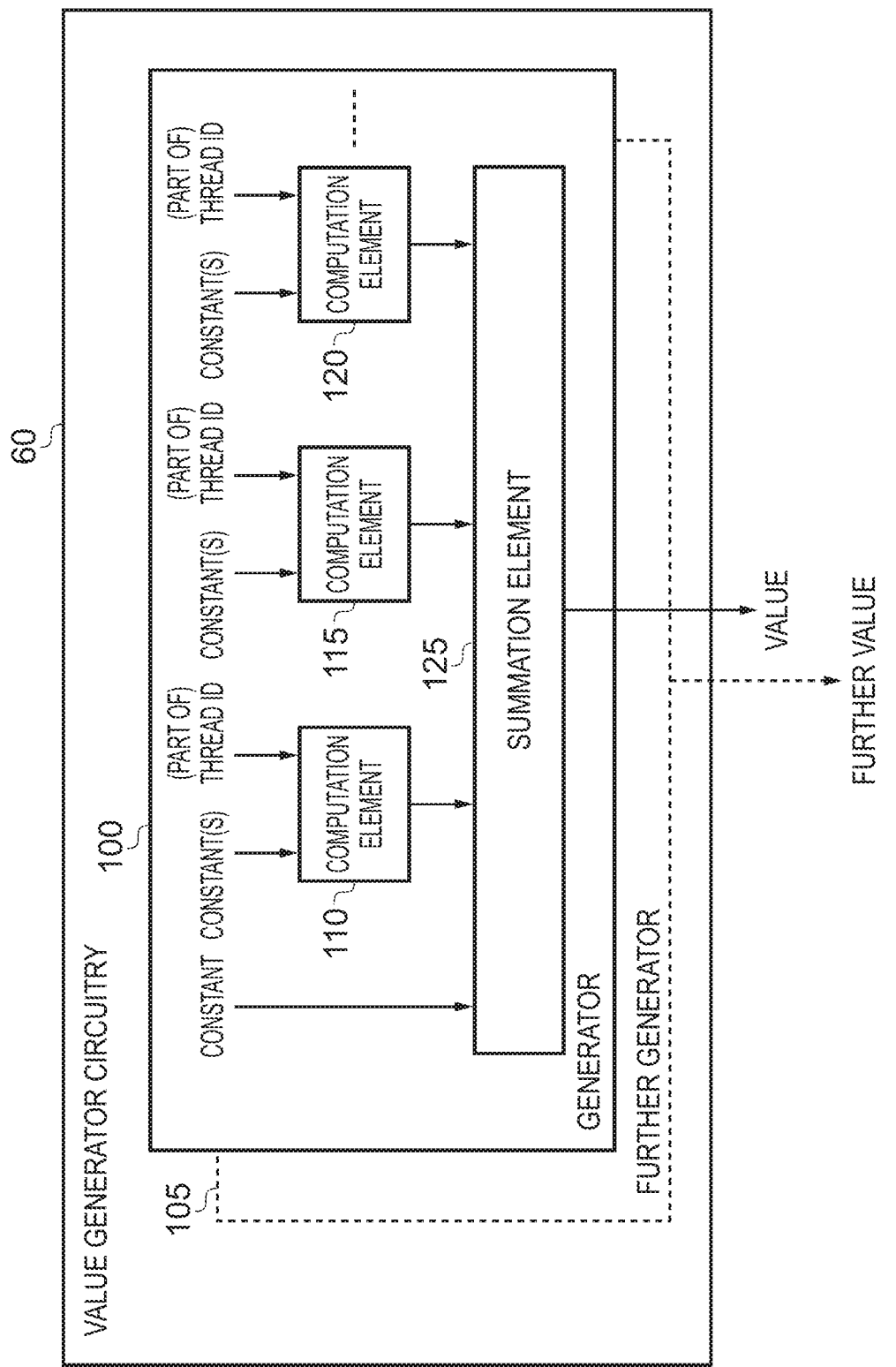
FIG. 2 is a block diagram illustrating in more detail the value generator circuitry of FIG. 1 in accordance with one embodiment.

As shown in FIG. 2, in one embodiment the value generator circuitry 60 consists of one or more generators 100, 105, each generator being arranged to generate a value required during execution of the threads by the execution pipeline 40. In one embodiment, each generator will generate a value for each thread, and accordingly if there are two generators 100, 105, the value generator circuitry 60 can in one embodiment generate, for each thread, two values required by that thread when it is being executed, both of the values being dependent on the thread identifier of the thread, and accordingly varying between the various threads executed by resources 42, 44, 46.

The value generator circuitry 60 can be configured in a variety of ways, but in one embodiment comprises a series of computation elements 110, 115, 120 used to perform a sub-computation on term specific inputs. As shown in FIG. 2, in one embodiment those term specific inputs include at least one constant and at least part of the thread identifier of the thread whose value is being generated. Where the N-dimensional range of thread identifiers specified in the job descriptor 70 is one dimensional, then typically each computation element will receive the entire thread identifier. However, where the N-dimensional range of thread identifiers is multi-dimensional, such that each thread identifier may comprise multiple coordinates, then each computation element may receive one of the coordinates of the thread identifier.

As shown in FIG. 2, the outputs from the various computation elements are input to a summation element 125 which adds those outputs together, and in one embodiment also adds a further constant provided to the summation element, with the result then being provided as the value output from the generator.

In one embodiment, the particular values given to the various constants input to the generator will dictate the computation performed, and in one embodiment those plurality of constants are defined within the job descriptor 70 set up by the CPU. This enables the CPU to configure how the values are generated by the value generator circuitry 60 from the various thread identifiers.

In one embodiment, the number of computation elements is fixed, and in particular in one embodiment the number of computation elements is dependent on the maximum number of dimensions supported by the value generator circuitry, and hence by the throughput processor 20. Hence, by way of example, if the maximum number of dimensions supported is three, then three computation elements may be provided in one embodiment.

However, in an alternative embodiment, not only may the constant values provided to each generator be configurable, but in addition the number of computation elements within each generator 100 may also be configurable. As will be described for example later with reference to FIG. 8, by enabling the number of computation elements to be varied, this can allow for some arbitrarily complex mappings between the thread identifier and the associated values produced, in the FIG. 8 example the values produced being addresses into a data image such as the data image 80.

Whilst in one embodiment the number of computation elements provided in each generator may be predetermined, in an alternative embodiment the value generator circuitry 60 may have a predetermined number of computation elements, but the way in which those computation elements are allocated to individual generators 100, 105 may be varied. Accordingly, in such an embodiment the various computation elements are shared between the generators of the value generator circuitry 60, for example on a time division basis.

Figure 3:
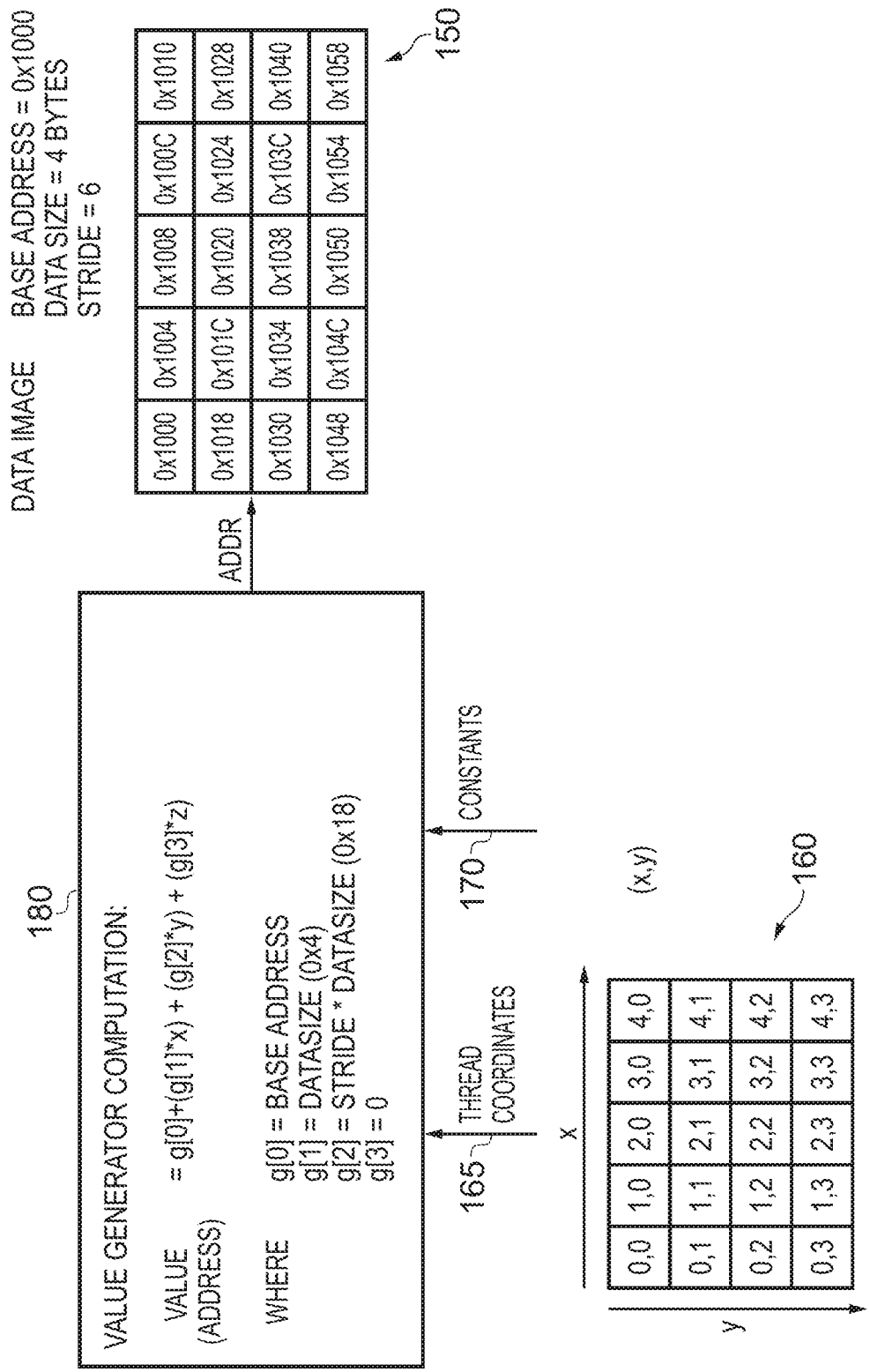
FIG. 3 schematically illustrates the operation of the value generator circuitry in accordance with one embodiment.

The computation performed by each generator 100, 105 can take a variety of forms, but FIG. 3 illustrates one example form of computation shown within the box 180. In particular, in this example each thread identifier can include an x, y and z coordinate, and four constants g[0] to g[3] are provided. To illustrate the operation of the computation, an example data image 150 is considered having a base address of 0x1000, and a data size of four bytes, i.e. each data value is four bytes in length. The block 150 shown in FIG. 3 then identifies the address associated with each data value in the two dimensional array of data values shown by block 150. The difference between the addresses of the first elements of two consecutive rows is referred to as the stride, and accordingly in this example is six. The stride can be measured in either bytes or number of data values, but for the purposes of the current embodiment description it is measured in terms of the number of data values. In some embodiments the stride may actually equal the width of the data image. However, for the purposes of the current example, the data image 150 has a width of five data values, whilst the stride is six data values, to allow better alignment of data in memory.

In this example, it is assumed that the N-dimensional range of thread identifiers takes the form of a two dimensional range of thread identifiers, matching the two dimensional form of the data image 150. As shown by reference numeral 160 in FIG. 3, the two dimensional range of thread identifiers is such that each thread identifier comprises an x and a y component. For simplicity, in this example a two dimensional data image 150 and a corresponding two dimensional range of thread identifiers 160 is shown, but the same principle can be applied to three dimensional data images and three dimensional ranges of thread identifiers. The various thread coordinates of each thread identifier are input over path 165 to the relevant generator 100, 105 within the value generator circuitry 60, and the corresponding constants to be used for all threads of the task are provided over path 170. As shown in FIG. 3, in this example the constant g[0] is equal to the base address of the data image 150, and hence in this example is equal to 0x1000. The constant g[1] is equal to the data size, which in this example is four bytes, and hence takes the hexadecimal form 0x4. The constant g[2] is equal to the stride multiplied by the data size, which is 24 in decimal, or 0x18 in hexadecimal. In this particular example, since only two dimensional arrays are being considered, the constant g[3] is set equal to zero.

As will be apparent from FIG. 3, for any particular combination of x, y coordinates forming a thread identifier, the output value produced by the computation shown in block 180 produces the memory address of the corresponding data value within the data image 150.

Figure 4:
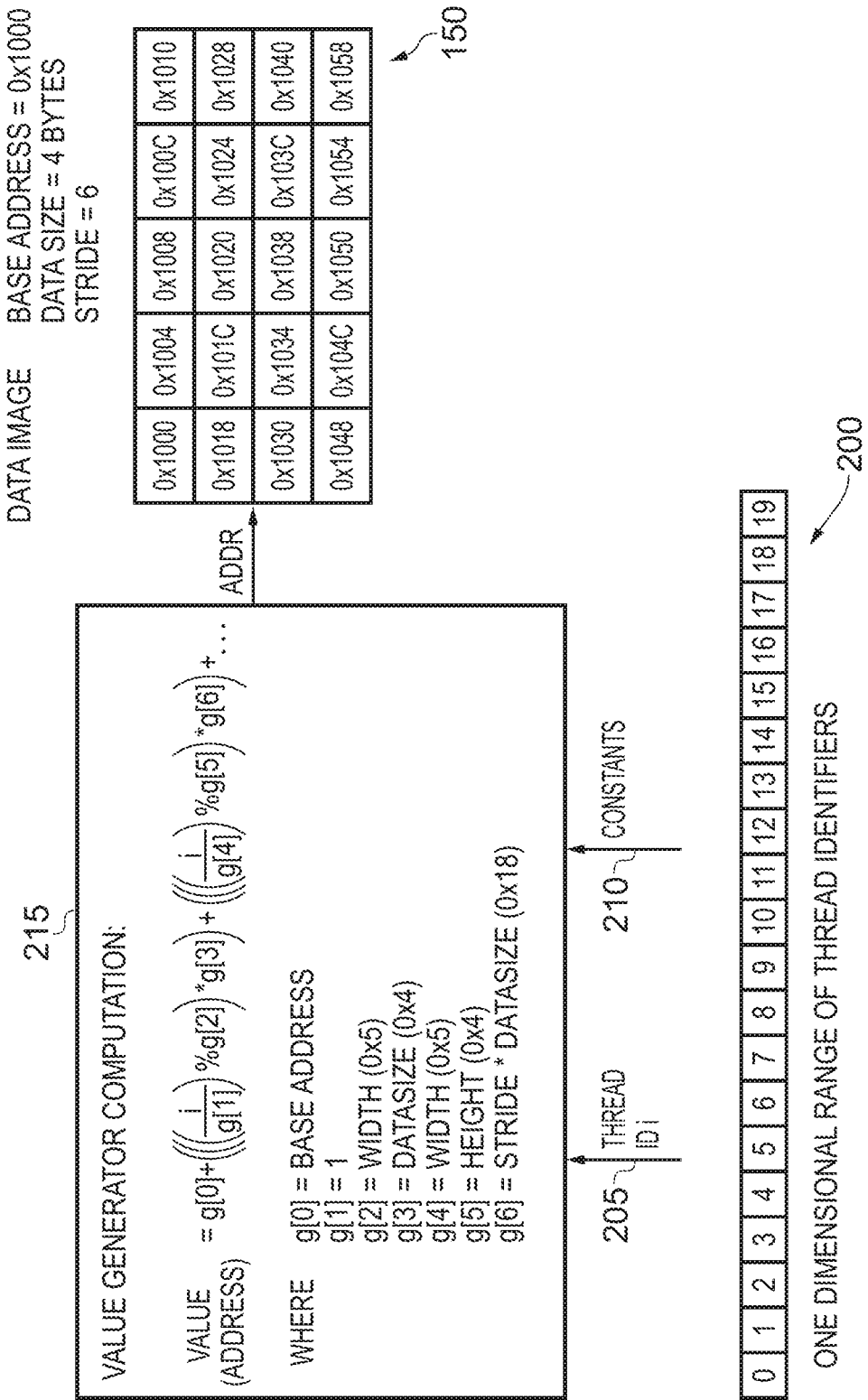
FIG. 4 schematically illustrates the operation of the value generator circuitry in accordance with an alternative embodiment.

Whilst in FIG. 3 the dimensionality of the range of thread identifiers matches the dimensionality of the data image, in an alternative embodiment this is not the case. FIG. 4 shows the same data image 150, but in this example a one dimensional range of thread identifiers 200 is provided. In particular, the thread identifiers range from zero through to a value one less than the total number of threads (i.e. 19 in this example since there are 20 threads, one for each of the data values in the data image 150). The computation set out in the box 215 identifies how the output value (namely the address of a corresponding data value in the data image 150) is computed based on the thread identifier input over path 205, and a set of constants input over path 210, again the constants being fixed for all threads of the task. In the equation set out in box 215, the percentage sign indicates a modulus operation. As can be seen, the sub-computation performed for each term has the same format, but with a different set of constant values provided. For the first sub-term, the constant g[1] is set equal to one, since no division is required. In this example, both the constants g[2] and g[4] are set equal to the width of the data image, namely 0x5. The constant g[3] is set equal to the data size, i.e. 0x4 to denote four bytes. Further, the constant g[5] is set equal to the height of the data image, namely 0x4 in this example. Finally, the constant g[6] is set equal to a value equal to the stride multiplied by the data size, which in this example is 24 in decimal or 0x18 in hexadecimal.

As will be apparent from the computation defined in box 215, this again enables the memory address of the appropriate data value in the data image 150 to be computed for each input thread identifier.

As will be described later for example with reference to FIG. 8, the general form of the computation in block 215 can be extended to include additional terms, again all of the terms being identical, but with a different three constant values being provided for each term. This enables an arbitrarily complex mapping from the linear thread identifiers to the various memory addresses of the data image 150.

The techniques described in FIGS. 3 and 4 can also be performed in respect of particular image regions within a data image, if it is not desired to process the entire data image. For example, FIG. 5 shows a data image 250, but where the image region to be processed is shown by the reference numeral 260. When adopting the FIG. 3 approach, all that is required when constructing the original two dimensional range of thread identifiers is to add one to each of the x and y dimensions so that the top left thread identifier is 1,1 and the bottom right thread identifier is 5,4. The constants g[0], g[1] and g[3] are exactly the same as in the FIG. 3 example. However, in this example the stride is 8, and accordingly the constant g[2] becomes 0x20. With these changes, the value generator computation 180 will again correctly map each thread identifier to a corresponding address within the data image region 260.

The FIG. 4 approach can also be used in connection with the data image region 260. When adopting the FIG. 4 approach, the constants g[1] through g[5] are unchanged. However, the base address constant g[0] is set equal to 0x1024 in order to identify the base address of the first data value within the data image region 260. Further, the constant g[6] becomes 0x20, given that the stride is 8 due to the size of the data image 250.

Figure 6:
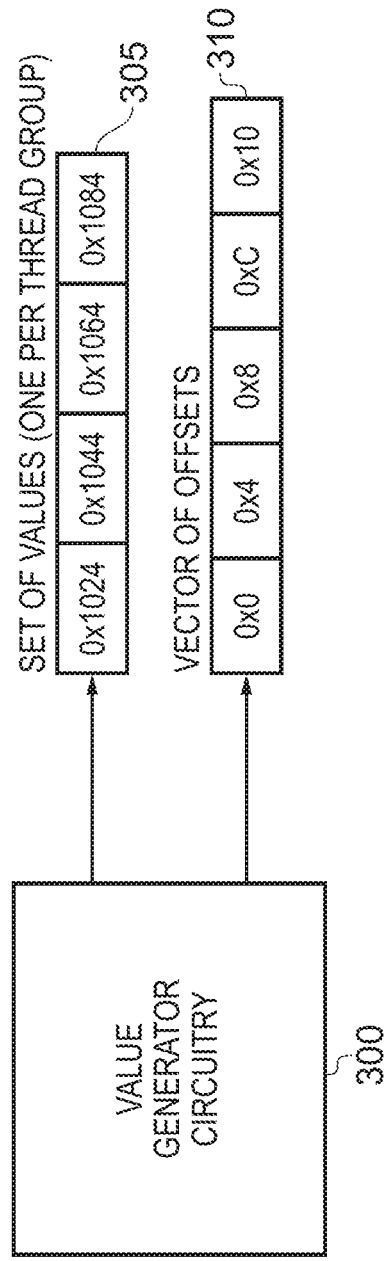
FIG. 6 illustrates an alternative embodiment of the value generator circuitry in accordance with one embodiment.

Whilst in one embodiment each generator 100, 105 can be arranged to generate a corresponding value for each thread, in an alternative embodiment it is not necessary to generate the value for each thread. In particular, in one embodiment the plurality of threads specified by the job descriptor can be split up into multiple thread groups. Within each thread group, a Single Instruction Multiple Thread (STMT) mechanism can be used to ensure that the threads within the thread group are executed in lockstep within the execution pipeline 40. As a result, at any particular point in time, all of the threads in the thread group will be executing the same instruction. If each thread group relates to a series of threads extending in the x dimension, then it will be appreciated that once the address value has been generated for one of threads, the address value for all of the other threads can be computed merely by adding an offset. Hence, as shown in FIG. 6 for the specific example image region 260 of FIG. 5, the value generator circuitry 300 may be arranged to generate a set of values 305, namely an address value for the first address in each thread group. In addition, a vector of offsets 310 can be generated which can be provided to the execution pipeline 40 to enable all of the other addresses for the thread group to be generated from the address within the set 305 produced for the corresponding thread group. This can significantly reduce the number of computations required by the value generator circuitry 60, whilst enabling the various address values to be readily generated within the execution pipeline using existing adder structures to add the offsets to an initial address specified in relation to the first thread of the thread group.

In the example of FIG. 6, it is assumed that each thread group consists of five threads. More typically, it will often be the case that thread groups include a number of threads which is a power of two, for example four, eight, sixteen, etc. However, for ease of illustration, the principle has been shown in FIG. 6 with reference to the data image region 260 assuming that a thread group can be constructed for each of the series of threads in the x dimension.

In addition it should be noted that typically the number of threads will be much larger than the examples provide in the figures (which are purposely small for ease of illustration). Hence, if a partial thread group is required at the end of a row, the overall impact is small. By way of example, if the width is 1001 and the number of threads in each thread group is 8, this will result in 125 complete thread groups and 1 odd thread group of size 1, which is a small overhead.

Figure 7A:
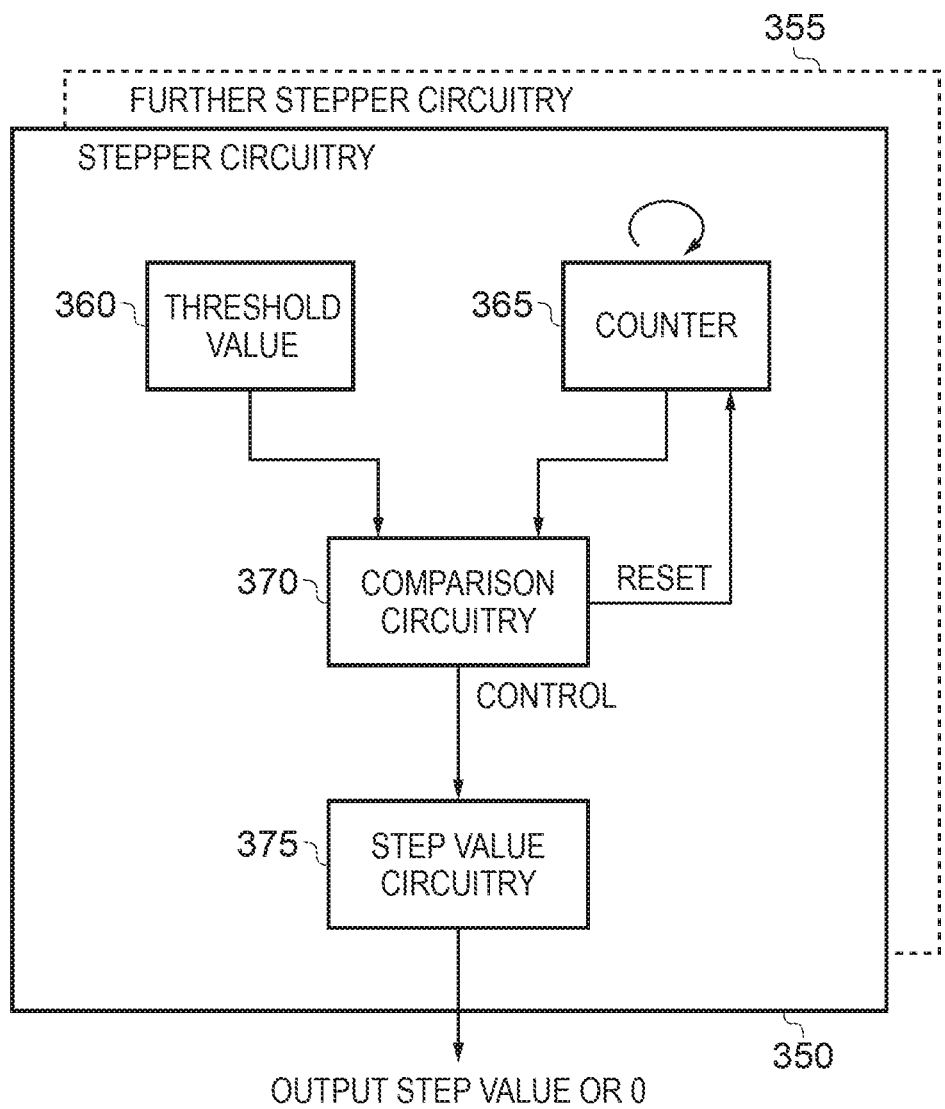
FIG. 7A illustrates stepper circuitry that may provide one example configuration of the computation elements of FIG. 2 in accordance with one embodiment.

In one embodiment, the functionality of the various computation elements 110, 115, 120 can be implemented using stepper circuitry such as shown in FIG. 7A. In particular, the use of stepper circuits can provide a very efficient implementation in embodiments where the value generator circuitry is arranged to generate a value for each of the threads determined from the N-dimensional range of thread identifiers specified for the task. Separate stepper circuits 350, 355 can be provided to implement the functionality of each computation element. The constants provided can be used to set a threshold value within the threshold value register 360, and a step value referenced by the step value circuitry 375. In one embodiment, the counter 365 is initialised at zero, and each time a value is required to be produced by the stepper circuitry 350, the counter is incremented, and then compared with the threshold value stored in the register 360 by the comparison circuitry 370. Based on the comparison, a control signal is sent to the step value circuitry 375 from the comparison circuitry 370. In particular, if the comparison circuitry 370 detects that the counter is less than the threshold value, then the control signal causes the step value circuitry to output a zero value. However, once the counter reaches the threshold value, the control signal from the comparison circuitry 370 causes the step value circuitry 375 to output the step value, and a reset signal is sent to the counter to reset the counter to zero.

Figure 7B:
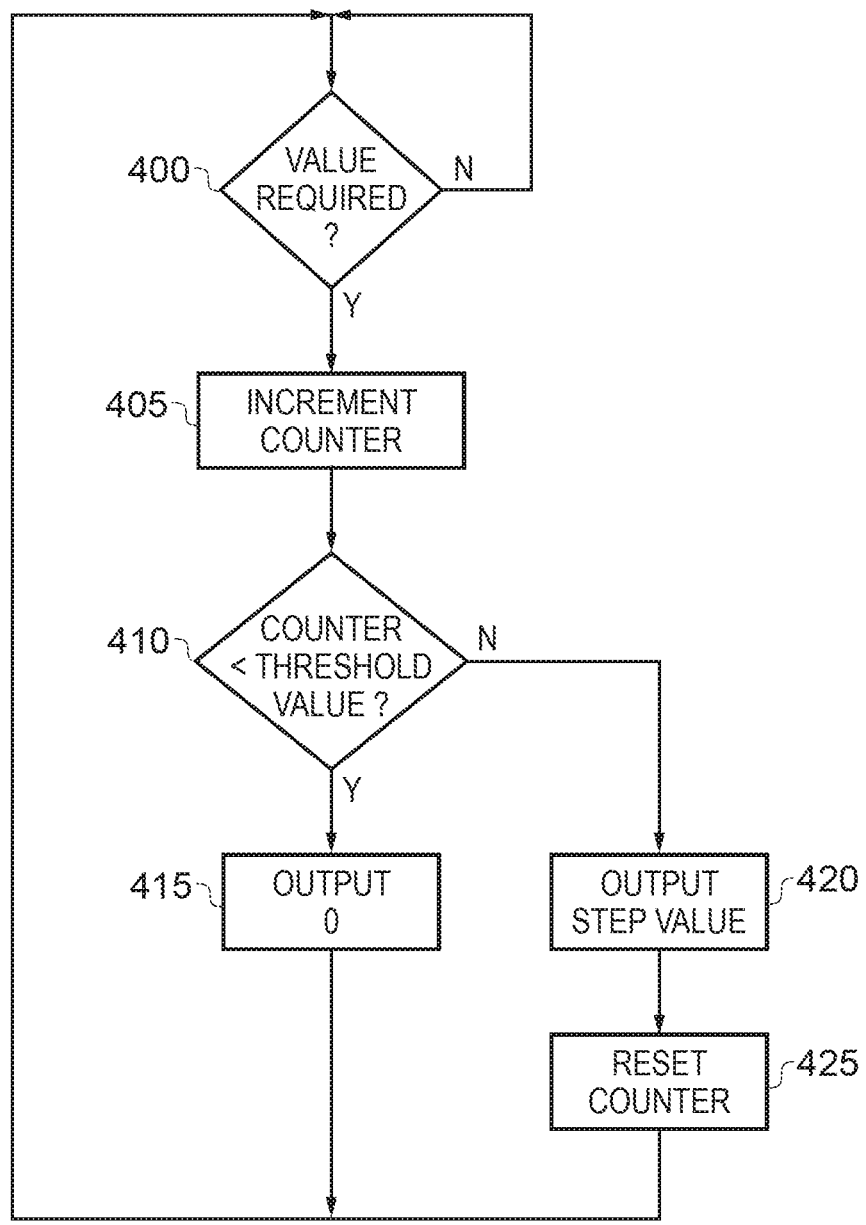
FIG. 7B is a flow diagram illustrating the operation of the stepper circuitry of FIG. 7A in accordance with one embodiment.

This process is shown in FIG. 7B. In particular, at step 400, it is determined whether a value is required, and when a value is required, the counter is incremented at step 405. Thereafter, it is determined at step 410 whether the counter is less than the threshold value. If so, then a zero value is output at step 415, and the process returns to step 400. However, if at step 410 the counter is determined to not be less than the threshold value, then the step value is output at step 420, and the counter is reset at step 425, whereafter the process returns to step 400.

If we consider by way of example seeking to implement the value generator computation of FIG. 4 in relation to the data image region 260 of FIG. 5, then the two terms shown in box 215 that include divide and modulus computations can be implemented using stepper circuits as shown in FIG. 7A. In particular, a first stepper circuit will have the threshold value set to one, and a step value set to four (representing four bytes). Accordingly, it will be seen that each time an output value is required, the first stepper circuit will output a value of four. This enables a series of addresses to be produced, starting with the base address 0x1000, and increasing by four bytes each time. A second stepper circuit is then used with a threshold of five and a step value of four, to cause the address output to skip to the next row when required. Hence, by combining the outputs from the two stepper circuits, the series of addresses within the data image 150 will be produced.

Similarly, with regard to FIG. 5, it will be appreciated that not every address increment required is four bytes, since at the end of each row there is a jump in address space to identify the next required address in the following row. This functionality can be achieved by a second stepper circuit, having a threshold value set at five, and a step value set equal to twelve. This will ensure that for every fifth value generated, the second stepper circuitry will output a value of twelve, outputting a value of zero otherwise. Accordingly, taking for example the situation where the last address generated was 0x1034, then the next time an output value is required, the first stepper circuitry outputs a value of four, and the second stepper circuitry outputs a value of twelve, thereby causing a value of 16 to be added to the previous result of 0x1034, in order to produce the next output address of 0x1044.

As will be appreciated, when using stepper circuits such as those discussed above, the previous output address is used as the starting address for the next cycle. Such an approach provides a very efficient and simple mechanism for sequentially generating each of the addresses within the data image region such as that shown by the element 260 in FIG. 5. In particular, the value (address) required for every thread can be readily generated using such simple stepper circuits, hence significantly reducing the complexity of the value generator circuitry.

As mentioned previously, when utilising the generator computation approach illustrated in FIG. 4, additional terms of the same form can be added to the computation performed, in order to allow for arbitrarily complex mappings between the one dimensional range of thread identifiers and the M-dimensional data image. Such an approach can be very useful in ensuring that the various resources of the processing circuitry 20 are utilised efficiently. This is illustrated by way of example with reference to FIG. 8, which shows a large data image 450 that needs to be processed by a plurality of threads. Rather than processing the threads in an order which would cause each row of the data image to be processed in turn, it has been found that a more efficient utilisation of the resources can be achieved if instead the threads are organised in blocks so as to process different portions of the data image at a time. For example, this can give rise to significantly improved utilisation of cache resources, by avoiding data being evicted merely to be reloaded into the cache at a later time. In the example of FIG. 8, it is assumed that 3×3 thread blocks are created, two such examples being the thread blocks 462 and 465 shown in FIG. 8, but it will be appreciated that the size of the various thread blocks can vary dependent on the desired implementation.

Figure 8:
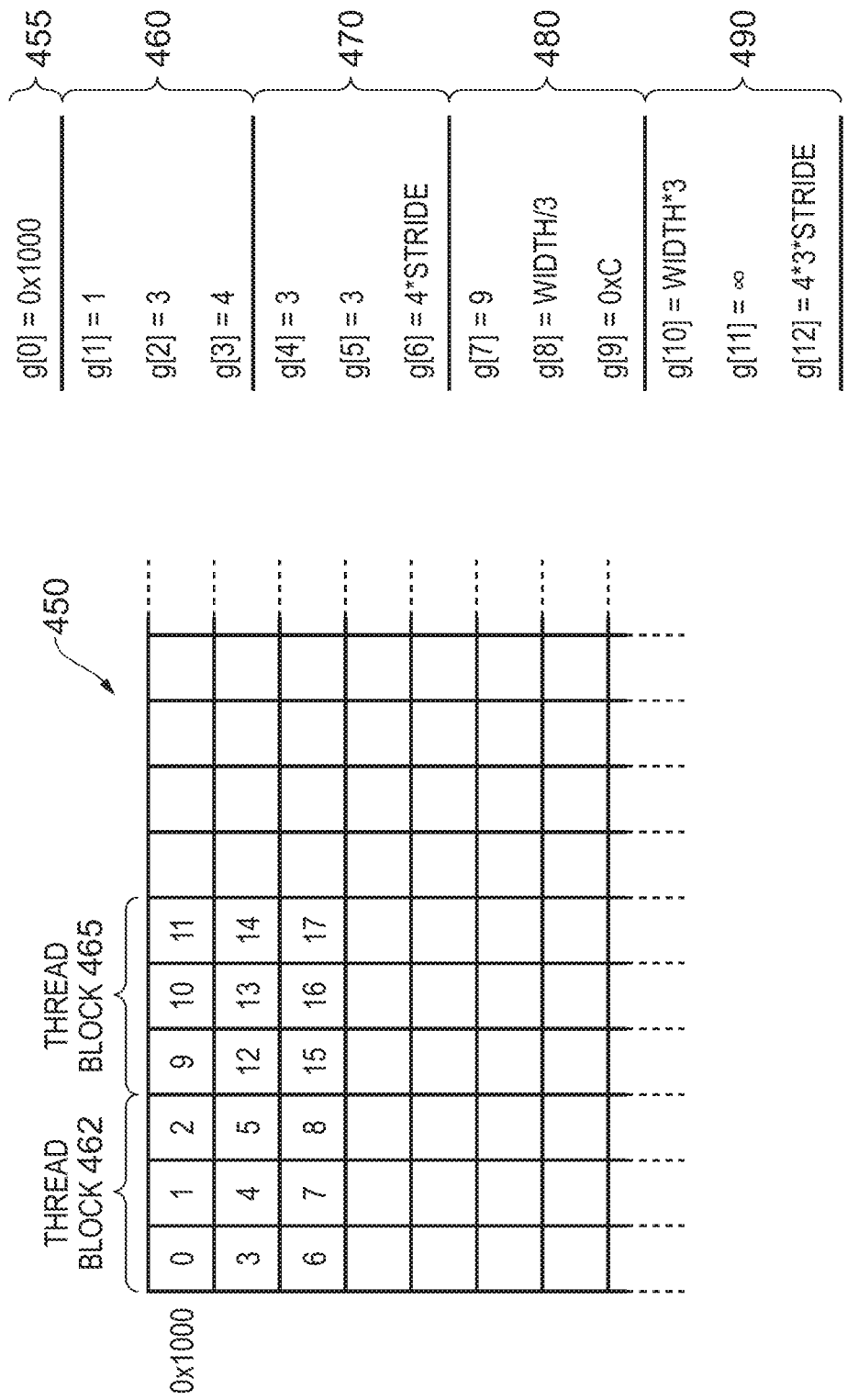
FIG. 8 illustrates how additional terms may be added to the value generator computation illustrated schematically in FIG. 4 in order to create thread blocks in accordance with one embodiment.

To achieve the mapping between the one dimensional range of thread identifiers and the two dimensional image 450 shown in FIG. 8, it is merely necessary to add two additional terms to the value generator computation 215 shown in FIG. 4, each of the terms having an identical form to the other terms, but using three different constants. FIG. 8 shows the constants used in each term. The constant 455 is the base address, as per the example of FIG. 4. The first set of constants 460 specify that g[1] is equal to 1, g[2] is equal to 3 (i.e. the width of the thread block), and g[3] is set equal to 4 (i.e. the data size of four bytes). This term causes the address to advance to the next element within each row of the thread block.

The second set of constants 470 specifies that the constant g[4] equals 3 (i.e. again the width of the thread block), g[5] equals 3 (i.e. the height of the thread block) and g[6] has a value equal to four times the stride value for the data image 450. The value of four is the data size (i.e. four bytes), and the stride will have a value depending on the overall size of the data image 450. This term causes the address to advance to the next row within each thread block.

For the third term, the constants 480 identify that g[7] equals 9 (essentially identifying the number of threads between each jump to an adjacent thread block in the x dimension), the constant g[8] is equal to the width of the data image 450 divided by three (to identify that the width is split into a series of thread blocks each containing three data values), and the constant g[9] is set equal to 0xC (identifying the separation in the x dimension between the corresponding elements in two adjacent thread blocks). This term causes the address to advance to the next block of nine threads once the end of the thread block is reached.

Finally, for the fourth term, the constants 490 include a constant g[10] which is set equal to the width multiplied by three (effectively identifying the number of thread mappings that will have taken place before jumping to a new thread block in the y dimension), the constant g[11] is set to a suitably large number to ensure that the modulus functionality has no effect in the fourth term (in this example infinity), and the third constant g[12] is set equal to 4×3×the stride (i.e. the data size of four bytes multiplied by the effective stride amount (given that each thread block occupies three rows and hence the effective stride amount is three times the stride of the data image 450)). This term causes the address to advance to the next row of thread blocks once the end of the row is reached.

Hence, it will be appreciated that the form of computation shown in FIG. 4 is very powerful, since it is possible to add further terms to the computation, where all of the terms perform the same basic computation, but where the constants provided to each term are changed, in order to allow arbitrary mappings of the one dimensional range of thread identifiers into the M-dimensional data image. This hence allows execution of the task to be optimised to make best use of the available resources of the processing unit such as the GPU performing that task without needing dedicated hardware to arrange this thread blocking.

Once the required values have been generated by the value generator circuitry 60, then all that is required within each individual thread is to add the instructions necessary to access those values. In the example of FIG. 9A, it is assumed that the values are stored into the special purpose registers 48 of FIG. 1, and then each thread loads the value relevant to that thread from the associated special purpose register into one of the general purpose registers of the register bank prior to then utilising the value. Accordingly, an MRS instruction (move from special purpose register to general register) is used in the example illustrated in FIG. 9A to load the contents of special register zero into a general purpose register x0, it being assumed that special register zero is used to store the value required by the thread P shown in FIG. 9A. Thereafter, a load instruction is used to load into the general purpose register x1 the data value found at the address stored in the register x0, this hence causing the data value at the calculated address to be loaded from the data image 80 in the example of FIG. 1.

FIG. 9B shows an optimisation, where the address value stored in the special purpose register can be used directly rather than needing to be loaded into the register bank first. In this instance, all that is required is a load instruction to load into one of the general purpose registers, in this example x0, the data value found at the address stored in the special register zero.

Without the techniques of the above described embodiments, a significant number of instructions would need to be added to each thread. If for instance the FIG. 3 example is considered, the following instructions would be needed in each thread:

MRS x0, thread_id_x
MRS x1, thread_id_y
MRS x2, base_address_reg
MRS x3, stride_reg
MLA x0, x1, x2, x0
LDR x0, [x2, x0, LSL #2]

The MLA instruction computes the offset (in elements) by multiplying the y coordinate by the stride and adding the x coordinate. The LDR (load) instruction then adds the offset to the base address, applying a shift to convert an element offset to a byte offset.

For more complex schemes, such as 3D coordinates, even more complex computation may be required.

Hence, it can be seen that within each thread, the complexity of the computations required can be significantly reduced, and in particular a whole series of instructions can be removed that would otherwise be required within each thread to compute the address value needed based on the thread identifier.

As will also be apparent from the above discussions, by moving such functionality into a dedicated value generator circuit 60, it does not just remove the complexity form the individual threads that need to be executed within the execution pipeline, but it is often the case that significant improvements in computational efficiency can be achieved by centralising the generation of the values within the value generator circuitry, rather than requiring each thread to independently calculate its own value. For example, if the values are generated in increasing order, strength reduction can be used to simplify the computation of the value for each subsequent thread identifier, for example by replacing some multiplies by additions, as described in FIG. 6.

Figure 10:
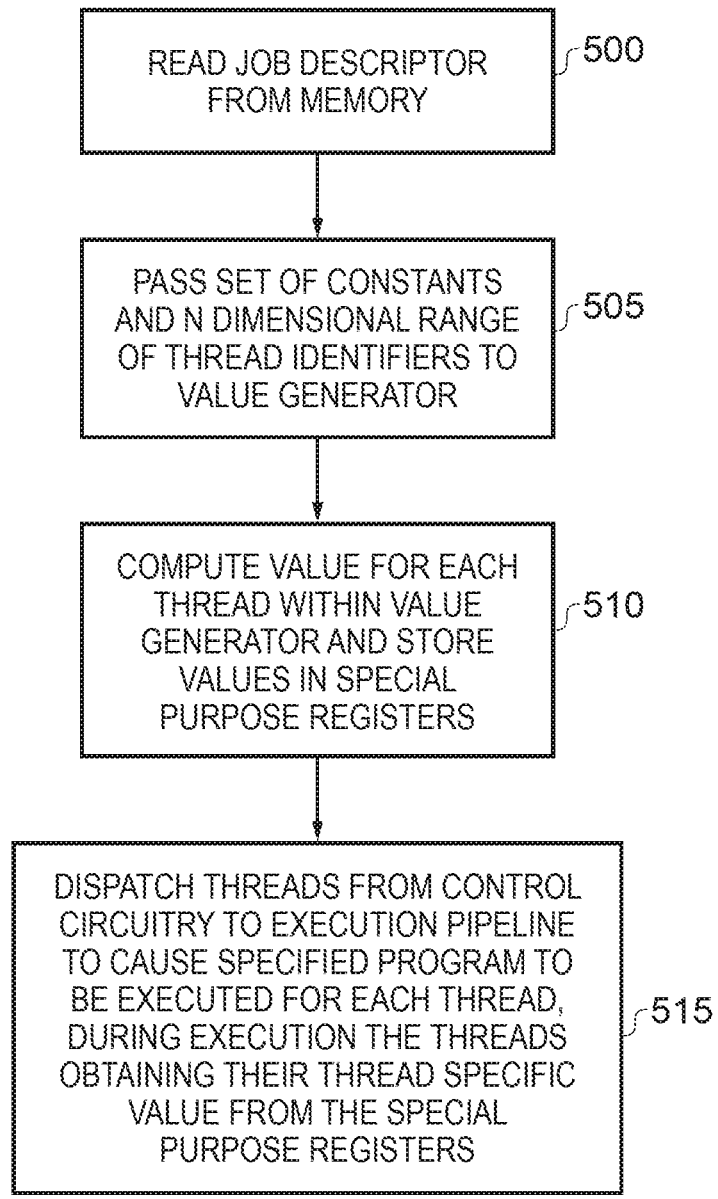
FIG. 10 is a flow diagram illustrating the operation of the throughput processor of FIG. 1 in accordance with one embodiment.

FIG. 10 is a flow diagram illustrating the steps performed by the throughput processor 20 when executing a task specified by a job descriptor 70 in memory 30, in accordance with one embodiment. At step 500, the job descriptor is read from memory by the control circuitry 55 of throughput processor 20. At step 505, the set of constants and the N-dimensional range of thread identifiers specified in the job descriptor are passed to the value generator circuitry 60, whereafter at step 510 the value generator circuitry computes the value for each thread and stores the resultant values in the special purpose registers 48.

At step 515, the threads are then dispatched from the control circuitry 55 into the execution pipeline 40, to cause the program specified by the job descriptor 70 to be executed for each thread. During execution, the threads will then obtain their thread specific value from the special purpose registers 48.

It will be appreciated that FIG. 10 is only intended to illustrate a general sequence of flow within the throughput processor. It will be appreciated that the exact sequence in which steps are performed may vary dependent on embodiment. For example, if there are an insufficient number of special purpose registers to hold all of the values that need to be generated, and the required threads are going to be executed in batches within the execution pipeline, then the values required for each batch can be generated and stored in the special purpose registers before that batch of threads is then executed. This process can then be repeated for each batch. Further, as mentioned earlier, in alternative embodiments it may be arranged that the value generator circuitry directly stores the generated values within registers of the register bank 50 ahead of them being required by each particular thread being executed within the execution pipeline.

Further, as discussed for example with reference to FIG. 6, in some embodiments it may be the case that a separate value is not generated for every thread, but instead a set of values is generated, one per thread group, and then in addition within the special purpose registers a vector of offsets is stored for reference by the threads of each thread group as they are executing.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus, comprising:
processing circuitry configured to execute a plurality of threads divided into a plurality of thread groups in order to process an M-dimensional array of data values stored in memory, each thread executing a same program in relation to a respective one of the data values in said M-dimensional array in parallel with the other threads in the same thread group, said same program being specified by a task processed by the processing circuitry, wherein the task further specifies an N dimensional range of thread identifiers and a set of constants including at least the base address for the M-dimensional array,
wherein each thread is associated with a thread identifier of said N dimensional range of thread identifiers, and each thread performs operations using a respective memory address to access the respective data value for the thread, the respective memory address being dependent on the thread identifier of the thread and the set of constants; and
value generator circuitry configured to sequentially generate said respective memory addresses in a plurality of cycles each requiring a value to be output, and configured to store said sequentially generated memory addresses in registers available to the processing circuitry, the value generator circuitry comprising a plurality of computation elements and a summation element, wherein:
each computation element is formed by stepper circuitry comprising a threshold value register storing a threshold value, storage storing a step value, and a counter, wherein the threshold value and the step value are determined based on said constants, and wherein the stepper circuitry, for each of the cycles, increments the counter, compares the counter to the threshold value and outputs the step value to the summation element in response to determining that the counter is not less than the threshold value,
the summation element, for each of the cycles, outputs the sum of a start address and the stepper circuitry outputs, wherein the start address comprises the base address for the first of the sequentially generated memory addresses and comprises the last memory address generated for each sequentially generated address after the first, and
each thread executes instructions to obtain said respective memory address from the registers rather than instructions to compute the memory address.

2. An apparatus as claimed in claim 1, wherein a subset of the computation elements are operated to sequentially generate said respective memory addresses and wherein the number of computation elements in said subset is configurable.

3. An apparatus as claimed in claim 2, where the configured number of computation elements in said subset is determined based on the set of constants including one or more of the value of M, the number of data values extending in each dimension of the M-dimensional array, the stride of the M-dimensional array, and the data size of the data values.

4. An apparatus as claimed in claim 1, wherein the number of computation elements in said plurality of computation elements is fixed to provide one computation element for each dimension of a maximum number of dimensions supported by the value generator circuitry.

5. An apparatus as claimed in claim 1, wherein said N-dimensional range of thread identifiers is a one dimensional range.

6. An apparatus as claimed in claim 5, wherein:
said M-dimensional array of data values is a two dimensional array; and
the number of active computational elements includes at least a second computational element and the set of constants are specified so that the stepper circuitry of the second computational element causes the address output to skip to a next row of said M-dimensional array when required.

7. An apparatus as claimed in claim 1, wherein said N-dimensional range of thread identifiers is a multi-dimensional range and each thread identifier specifies coordinate values in said N-dimensional range.

8. An apparatus as claimed in claim 7, wherein N=M.

9. An apparatus as claimed in claim 1, wherein said set of constants further includes a data size of the data values in said M-dimensional array and a number of data values extending in each dimension of the M-dimensional array.

10. An apparatus as claimed in claim 9, wherein the step value of a first computational element of the plurality of computation elements is the data size and the threshold value of a second computational element of the plurality of computation elements is the number of data values extending in the first dimension of the M-dimensional array.

11. An apparatus as claimed in claim 1, wherein the value generator circuitry is configured to generate said memory addresses for said plurality of threads in batches corresponding to the thread groups.

12. An apparatus as claimed in claim 1, wherein said value generator circuitry is arranged to precompute the memory addresses for the threads prior to the processing circuitry executing the threads.

13. An apparatus as claimed in claim 1, wherein the apparatus is a graphics processing unit (GPU) and the data values are pixels of an M-dimensional data image.

14. An apparatus as claimed in claim 1, wherein the program is an OpenCL kernel.

15. A method of executing a plurality of threads, comprising:
   employing processing circuitry configured to execute a plurality of threads divided into a plurality of thread groups in order to process an M-dimensional array of data values stored in memory, each thread executing a same program in relation to a respective one of the data values in said M-dimensional array in parallel with the other threads in the same thread group, said same program being specified by a task processed by the processing circuitry, wherein the task further specifies an N dimensional range of thread identifiers and a set of constants including at least the base address for the M-dimensional array,
   wherein each thread is associated with a thread identifier of said N dimensional range of thread identifiers, and each thread performs operations using a respective memory address to access the respective data value for the thread, the respective memory address being dependent on the thread identifier of the thread and the set of constants; and
   employing value generator circuitry configured to sequentially generate said respective memory addresses in a plurality of cycles each requiring a value to be output, and configured to store said sequentially generated memory addresses in registers available to the processing circuitry, the value generator circuitry comprising a plurality of computation elements and a summation element, wherein:
   each computation element is formed by stepper circuitry comprising a threshold value register storing a threshold value, storage storing a step value, and a counter, wherein the threshold value and the step value are determined based on said constants, and wherein the stepper circuitry, for each of the cycles, increments the counter, compares the counter to the threshold value and outputs the step value to the summation element in response to determining that the counter is not less than the threshold value,
   the summation element, for each of the cycles, outputs the sum of a start address and the stepper circuitry outputs, wherein the start address comprises the base address for the first of the sequentially generated memory addresses and comprises the last memory address generated for each sequentially generated address after the first, and
   each thread executes instructions to obtain said respective memory address from the registers rather than instructions to compute the memory address.

* * * * *